May 11, 1965   R. G. TUTTLE   3,182,357
CHECK-OUT REGULATOR SYSTEM FOR STORES
Filed Oct. 18, 1961   4 Sheets-Sheet 1
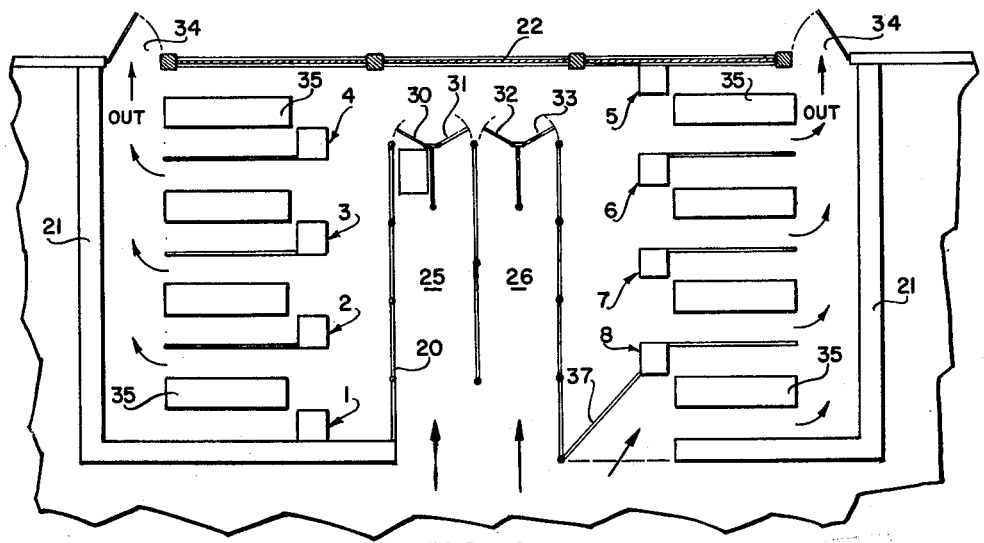
FIG_1
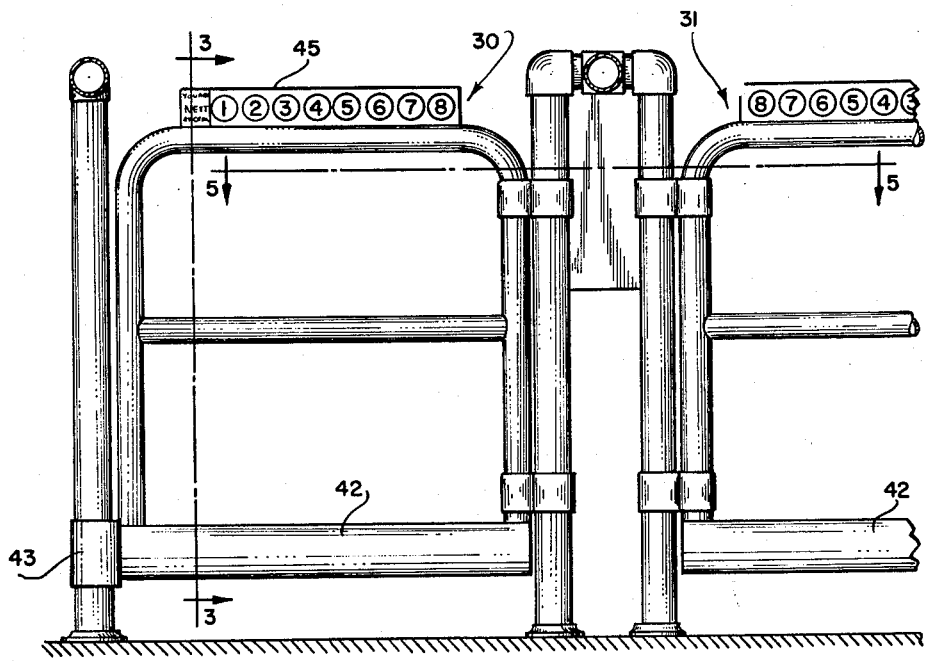
FIG_2
INVENTOR.
ROBERT G. TUTTLE
BY Roy L. Wonder
Agent May 11, 1965 R. G. TUTTLE 3,182,357
CHECK-OUT REGULATOR SYSTEM FOR STORES
Filed Oct. 18, 1961 4 Sheets-Sheet 2

INVENTOR.
ROBERT G. TUTTLE
BY Roy L. Wonder
Agent

INVENTOR.
ROBERT G. TUTTLE

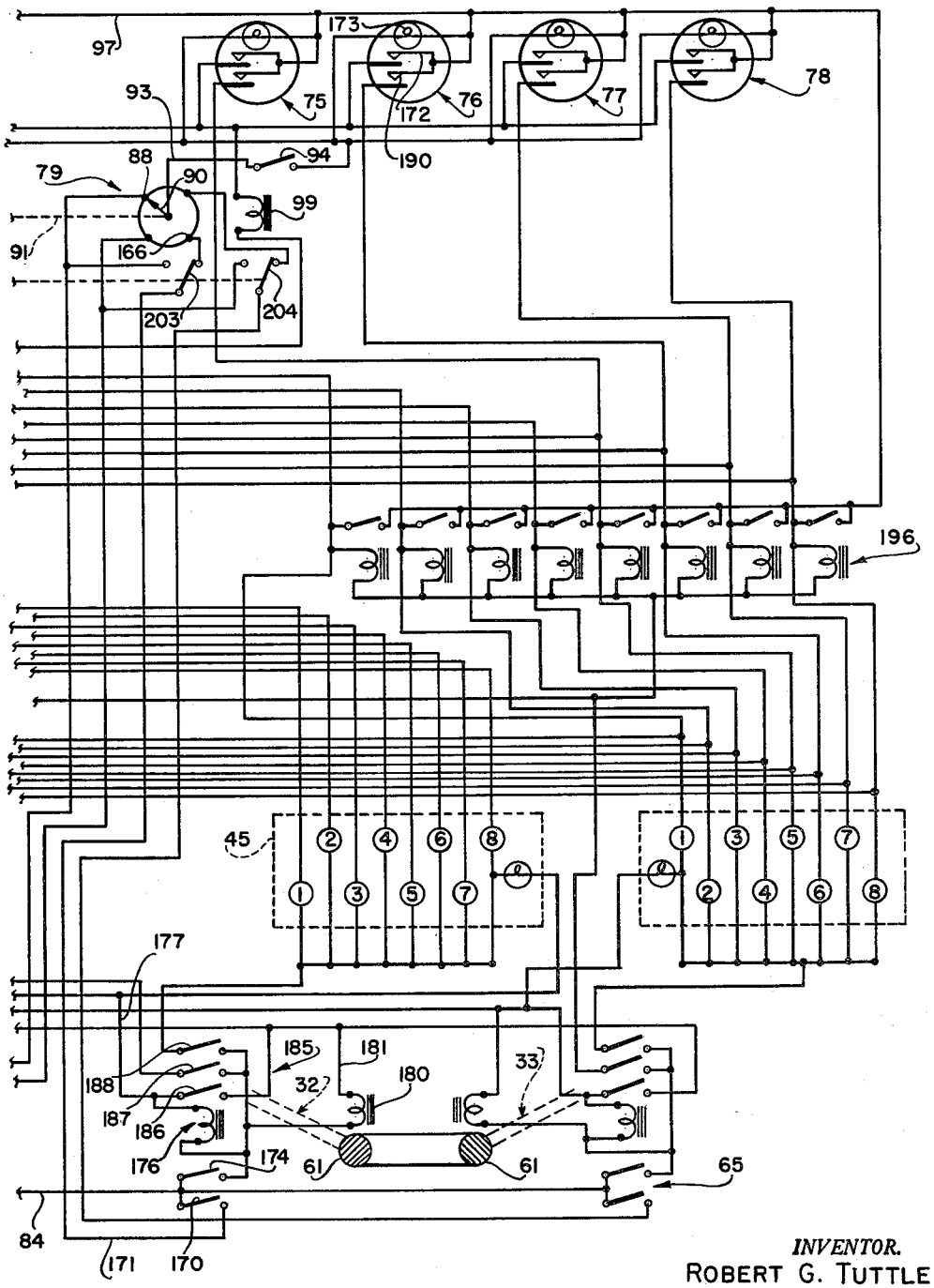
FIG_6B

United States Patent Office 3,182,357
Patented May 11, 1965

3,182,357
CHECK-OUT REGULATOR SYSTEM FOR STORES
Robert G. Tuttle, 547 Tuallitan Road, Los Angeles, Calif.
Filed Oct. 18, 1961, Ser. No. 145,790
9 Claims. (Cl. 20—1.7)

This invention pertains to apparatus to regulate the handling of large numbers of people in an individual manner. More particularly it provides a means of fairly handling large numbers of individuals each of whom require personal attention at a relatively small number of servicing stations.

Large commercial institutions have found that their costs of operation are minimized where a small number of personnel service a large number of individuals. For instance, banks provide a small number of tellers at a long counter and provide large space in which depositors can line up for service at each teller's position. Modern supermarkets provide for customer self-service with a small number of check-out clerks who total the prices on the goods and make change for the customer. In both the bank and the supermarket the depositors or customers go to the shortest line on the only assumption that can be made which is that each depositor or customer will require an equal amount of time so that he will be served in turn equally with the others waiting to be checked.

Experience will show that each depositor or customer does not require the same amount of time for service as does the next. In the bank, a depositor having a large number of items to deposit will require much more time than the person who has a single check to deposit. In the grocery store, one who has a large number of items to purchase will take more time for service as will the person who writes a check for his goods and requires initials from the store manager than the person who has a small number of goods or who pays cash at the check-out station. The customers or depositors approaching the check-out line are faced with the problem of selecting the line which will give him the quickest service. It is difficult to tell which individuals or person who will cause the delay so as to detain him an unfair length of time.

A solution to this problem is to serve each individual in the order of his arrival in the service area. This would obviously require that as each service or check-out person became free he would serve the individual who had been waiting longest regardless of his location to the line in which the individual is standing. This would obviously eliminate a line at each check-out station but would require a space between the lines and the check-out station with means to move to any checkout station from any line. One approach to a solution to this problem would be to provide a single line in a single entrance gate to a service area with some sort of regulating means whereby the person or individual at the head of the line would be signaled to the free check-out station as it opened up. It is obvious, however, that a single line would extend a great distance away from the service area when peak customer hours were experienced. Therefore a plurality of entrance gates are necessary in order to conserve space. With the plurality of gates there is some means necessary to open the gates in turn to provide a fair handling of the customers.

It is one of the important objects of the invention to provide a regulated means of handling large numbers of individuals by a few service people.

It is another important object of this invention to provide a means for equal treatment of each of a large number of people by limited numbers of service stations.

It is another important object of this invention to provide a means to relieve the individual to be served from having to choose the most advantageous of several service positions.

It is another object of this invention to provide a means whereby a plurality of service stations or positions may serve a plurality of sources of individuals in exact rotation.

It is another important object of this invention to provide a means to select from a plurality of sources in order.

It is another important object to provide a means to direct the individual to a station or position available to render service.

It is another important object of this invention to provide a means by which full or part capacity service can be used at will.

It is another important object to provide a means for economic utilization of space in a large commercial institution.

The apparatus which provides a means to attain these several objects includes an enclosed service area, a plurality of entrance gates to the service area, a plurality of service or check-out stations between the entrance gates and the exit from the service area, means adjacent to each entrance gate to detect the presence of an individual needing service, means at each check-out station to indicate availability to render service at the next entrance gate in rotation, means to identify the availavle check-out station at the next entrance gate, means to unlatch the entrance gate, means to select another entrance gate in rotation responsive to the passage of the last individual to the check-out station.

Further objects and advantages beyond those set out above will become apparent from the following detail description and claims taken in conjunction with the drawings in which like numerals indicate like elements.

FIGURE 1 shows the general arrangement of the service area.

FIGURE 2 shows a view of an entrance gate.

FIGURES 6A and 6B show the circuitry of the present invention.

Figure 3:
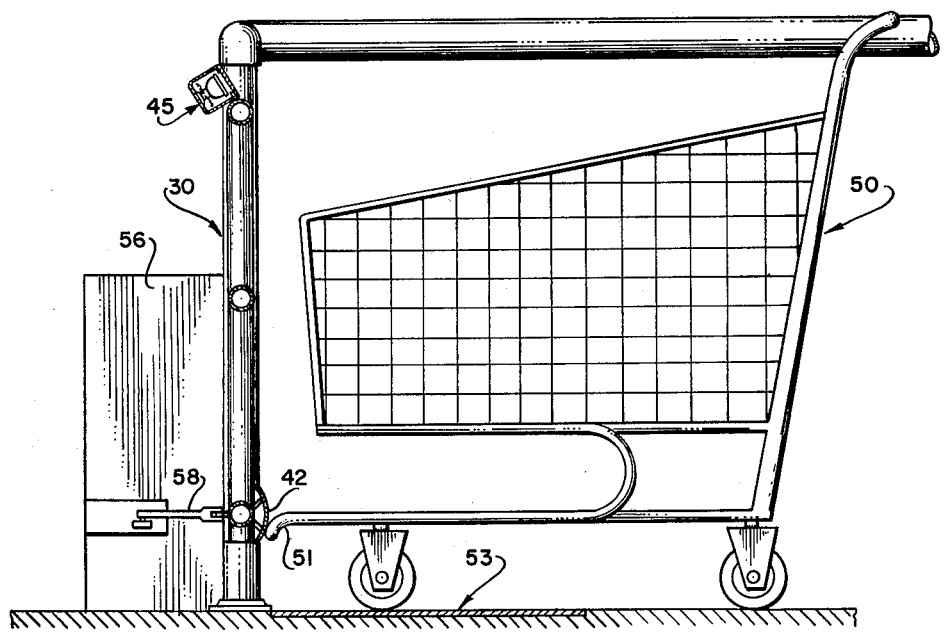
FIGURE 3 is a view taken on lines 3—3 of FIGURE 2.

FIGURE 1 shows a broad floor plan for a service area in a commercial institution which provides a means to handle a maximum number of individuals needing service in a minimum amount of floor space. The service area is enclosed by rails 20, shelves 21 and a wall 22 or other suitable alternatives. Entrance is gained through aisles 25 and 26 having four gates 30 through 33 at their ends. Between the gates and the exits 3A are eight service or check stations where each of the individuals passing through the gates may receive personal service from the personnel operating the check-out stations. The check-out stations in FIGURE 1 are shown adjacent counters 35 which would be typical in the installation as used in a supermarket. If the floor plan shown were to be used in a bank, the counters 35 will be of a shorter length. Individuals passing through gates 30 to 33 will be directed by means to be described below to any one of stations 1 through 8. In some markets which might use a cart for individuals purchasing large amounts of goods, there needs to be some provision for quick service for those few individuals who carry two or three items in their hands. A barrier 37 near check-out station 8 may be swung from its dotted line position to the solid line position adjacent to check-out station 8 to provide express service of customers entering directly to station 8. It is contemplated that the efficiency of the present invention will all but eliminate the need for the use of this express line and is shown here only to indicate the versatility of this invention.

FIGURE 2 shows in detail the entrance gates 30 and 31 found at the end of aisle 25 in FIGURE 1. These gates are shown in the form as used with a grocery cart in a supermarket but would vary little in any other environment. Entrance gates 30 and 31 are shown hinged from a central post which provides further efficient use of space in that latching and closing mechanisms may be mounted one on top of the other. Each has a bumper strip 42 against which a grocery cart in a supermarket may be pushed to open it. As seen in FIGURE 1 the gates open inwardly and are stopped by stop 43 in their closing motion. At the top of each gate is a signal light director 45 having a plurality of director lights representing the check-out station numbers and a pair of master "You Are Next" lights which are shown in more detail in FIGURE 4.

FIGURE 3 shows a side view of gate 30 with signal light director 45 on its top angled in such a fashion so that the average individual can readily see it. A typical grocery cart 50 is shown just in front of the gate with its frame 51 adjacent the bumper strip 42. The front wheels of the cart are shown resting on a mat switch 53 which senses the presence of an individual or the cart which requires some service at the check-out station within the service area shown in FIGURE 1.

Figure 4:
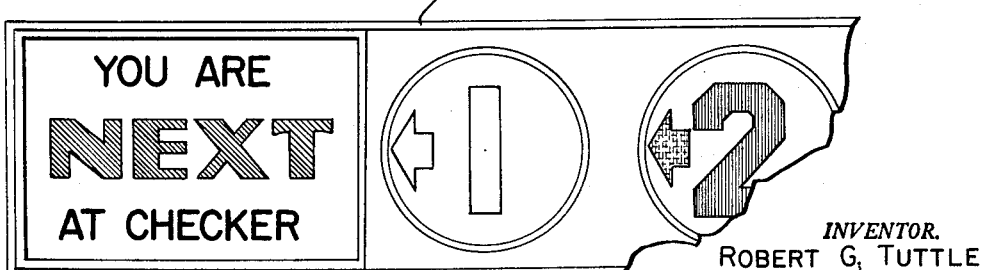
FIGURE 4 is an enlarged view of the director signal light.

FIGURE 4 shows the individual director signal lights in the signal light director 45 in more detail. Note that each one has an arrow provided adjacent the number behind which a light will be illuminated to give the signal to tell the individual or customer awaiting service at gates 30 through 33 which direction to go to find the particular check-out station to which he has been directed.

Figure 5:
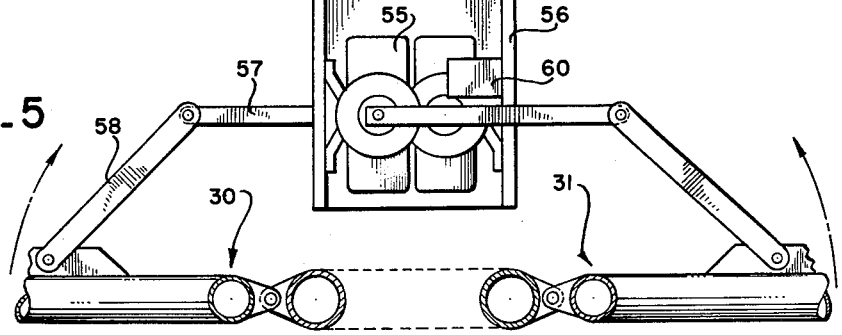
FIGURE 5 is a view taken on lines 5—5 of FIGURE 2.

FIGURE 5 shows the gate closing mechanism which may be the usual pneumatic closer found on doors shown by numeral 55 as housed in housing 56 after the gate has been pushed open the closer 55 through arm 57 and link 58 will cause it to return to its closed position. A latch 60 prevents opening of the gate until the operator of the check-out station is ready for the individual to come for service.

Figure 6A:
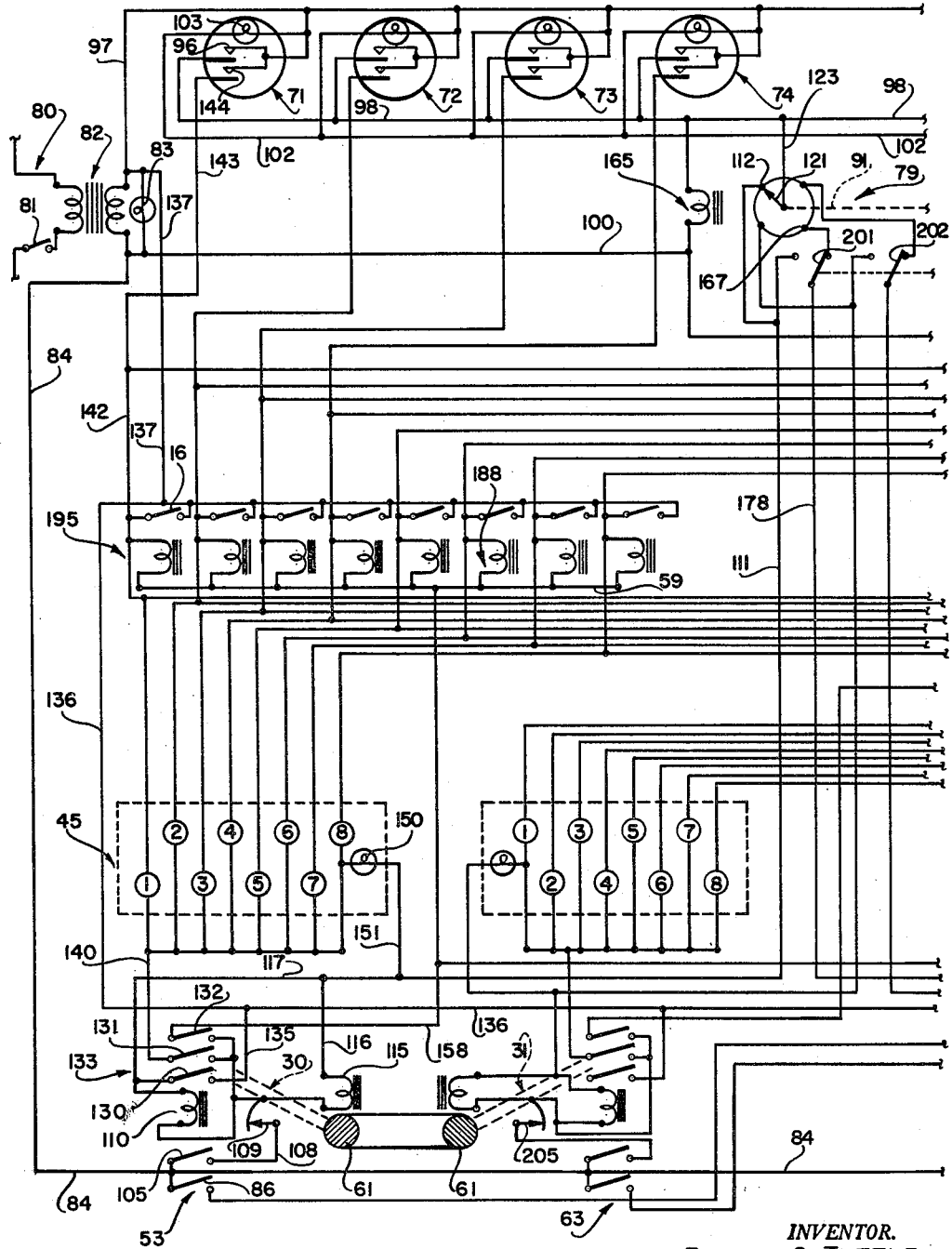

FIGURES 6A and 6B taken together show the circuitry with which the present invention performs its function. FIGURES 6A and 6B should be placed side by side for a clear understanding of relation of the various lines and connections. Entrance gates 30, 31, 32 and 33 are shown along the lower side of the figure hinged on the vertical axes 61. In front of the entrance gates 30 through 33 are two-pole mat switches 53, 63, 64 and 65 operated by the pressure of a person or other object for the purpose of detecting the presence of a customer or individual to be served. When a person or cart rests on the mat switch as shown in FIGURE 3, both poles will be closed which will give an indication to the service person at the check-out station in the manner described below.

Check-out stations 1 through 8 have control and indicator means 71 through 78 each of which includes a signal indicator and a double throw open biased switch. Gate selector 79 selects the next entrance gate in sequence. When an individual to be served is standing in front of the entrance gate selected by the gate selector 79, the mat switch for that particular gate will be closed. When the service person operates the control indicator means at his check-out station, he will receive indication of the presence of the individual at the entrance gate, signal director 45 will indicate which service person is available and the gate will be unlatched so that the individual may push it open and proceed as directed to check-out.

It is now well to review the detailed operation of the elements of the invention particularly the circuitry shown in FIGURES 6A and 6B. An alternating current power source 80 is connected by switch 81 to transformer 82 which reduces the normal 110 volts to something in the area of 20 to 30 volts. Pilot light 83 gives indication that switch 81 is closed and the system is ready for operation. Line 84 furnishes power to the mat switches 53, 63, 64 and 65. Closure of the lower pole 86 of switch 53 assuming that a customer were waiting at gate 30 will supply power to line 87 and contact 88 and brush 90 of the gate selector rotary switch. Note that the gate selector rotary switch has two brushes which are fixed for unitary rotation on a shaft shown diagrammatically by the dotted line 91. Brush 90 is connected to line 93 and open switch 94. Closure of pole 96 of the control indicator means 71 at check-out station 1 will close the circuit from the upper side of transformer 82 through line 97, line 98, solenoid 99 and line 100 to the lower side of the transformer 82 to close switch 94. Closure of switch 94 will complete a circuit through line 102 to the indicator light 103, line 97 to the upper side of the transformer 82. Indicator light 103 may be any means which may be operated electrically but is shown here as in integral light-switch combination so that a signal button will appear on the cash register or other location at the check-out station 1.

Closure of upper pole 105 of the mat switch 53 and the pole 96 of the control-indicator means 71 at station 1 will complete a circuit through line 108, switch 109 which is normally closed when gate 30 is closed, gate solenoid 110 line 111 to the contact 112 of the upper rotary switch of gate selector 79. A circuit from switch 109 through unlatch solenoid 115 line 116, and line 111 to contact 112 will also be completed. The circuit will continue through brush 121 which is connected to line 123, line 98 up to switch 96, line 97 back to the upper side of transformer 82.

Energization of gate solenoid 110 will cause poles 130, 131 and 132 of gate switch 133 to be closed. Closure of pole 130 will complete a circuit through line 135, line 136, line 137 to the upper side of transformer 82 to keep gate solenoid 110 energized even after the open-biased pole 96 is released so long as latch switch 53 and switch 109 are closed. Closure of pole 131 of gate switch 133 will complete a circuit through line 140, director signal light No. 1 on the signal director 45, line 142, line 143 to the lower pole 144 of the control indicator means 71 which was closed simultaneously with pole 96 and through line 97 to the upper side of transformer 82. Simultaneous with the closure of pole 131 and pole 96 of the control indicator 71, a circuit will be completed through the master "You Are Next" light 150 in the signal director 45 through lines 151 and line 111 through the circuit previously described in the gate selector 79. Release of the control-indicator 71 will not extinguish the director signal light No. 1 since closure of pole 132 of gate switch 133 will complete a circuit through line 158, line 159, solenoid 160 which will cause switch 161 to close to complete a circuit through line 137 to the upper side of the transformer 82. Thus, so long as the mat switch 53 and switch 109 are closed, solenoids 110 and 160 will be energized to maintain a circuit to keep director signal light 1 and master light 150 on to give continuous direction.

Closure of the pole 96 will complete a circuit through lines 98 and 100 to energize the solenoid 165 to cause the gate selector 79 to rotate and select the next gate in sequence which in this case will be gate 31. Energization of solenoid 165 will move an armature (not shown) against a spring or other biasing means which will cause the armature to return to rotate shaft 91 and with it brushes 90 and 121 to the next contact positions of the rotary switches which make up gate selector 79 so that the individual at the next gate in sequence will be accepted for service next.

The operation of the first gate 30 in conjunction with the check-out station 1 has been described above. It will be obvious that an individual or customer at any one of the gates 30 through 33 may be directed to any one of the check-out stations 1 through 8 by means of the circuitry shown. For instance if the service person at check-out station 6 were free and the gate selector 79 was on position 3 so that brushes 90 and 121 were on contacts 166 and 167, and a customer were at gate 32 closure of the mat switch 64 would provide a source of power to the open switch 94 through lines 171, contact 166 brush 90 and line 93. Closure of the control-indicator means 76 would cause upper pole 172 to complete a circuit through the solenoid 99 to close switch 94 which would complete a circuit through the indicator light 173. Closure of the upper pole 174 of the mat switch 64 would energize solenoid 176 by completing the circuit through lines 177, 178, contact 167, brush 121, line 123, the upper pole 172 of control indicator means 76 and line 97 back to the upper side of the transformer 82. Closure of pole 174 in the mat switch 64 would likewise energize unlatch solenoid 180 to complete a circuit through lines 181, 178, contact 167 brush 121, line 123, the upper pole 172 of control indicator means 76 and line 97 back to the upper side of the transformer 82. Closure of the three poles of the entry gate switch 185 will cause performance of the same functions as closure of those poles in entry gate switch 133. Closure of pole 186 will provide a hold current to keep 176 energized. Pole 187 will provide a current to energize solenoid 188 to hold a current on light 6 of the gate director 45 on gate 32. Closure of pole 189 will provide means to complete a circuit from the lower pole 190 of control indicator 76 at check-out station 6.

Ordinarily it is not feasible to use more than one of the plurality of director signal light holding solenoids in the bank 195 at any one time. Therefore, it is logical that one bank of director signal light holding solenoids would be required for each gate. However, experience has shown that starting with any one gate in a sequence of operation, by the time the third thereafter gate is ready for selection that first gate has completely closed thus de-energizing the director signal light hold solenoid which had been in operation for that first gate. Therefore only two banks of director signal light holding solenoids are provided, one bank serving every other gate. Bank 195 as shown serving gates 30 and 32 while bank 196 is shown as serving gates 31 and 33.

During periods of light traffic, it is not necessary to use four gates to handle all of the individuals awaiting service. The need for regulated check-out however remains. Therefore a means to provide for this regulated check-out procedure using only two gates instead of four is provided by means of four pole and single throw switch 200 as a part of the gate selector 79. Note that poles 201 through 204 move over to contact the several lines from gates 30 and 31 so that every other contact on the dual rotary switch of the gate selector 79 is now connected to the same circuit. In other words in the top rotary switch contacts 112 and 167 are connected to entrance gate 30 and in the lower rotary switch contacts 88 and 166 are connected to gate 31 circuitry. In the event that there are not enough customers or individuals needing service to fill the paths to the four gates the second two gates are cut off and gates 30 and 31 used providing for more efficient entrance into the service area.

When only gates 30 and 31 are in operation, switch 200 having been thrown to the left, it is necessary to provide some means to break the circuit to the entrance gate solenoids prior to the time that the customer steps off the mat switch in front of the gate. Therefore, in switches 109 and 205 a moving part is fixed to the gate 30 or 31, or closing means 55 and a stationary member is associated closely therewith so that when the gate is closed the switch will be closed and when the gate becomes about one-third open the switch will be opened. This then permits the customer next behind to be immediately directed by the next free service person at the various check-out stations rather than waiting for the mat to be completely cleared to open mat switch 53 or 63 as the case may be.

Operation of the present invention from the point of view of the customer or individual who desires service will be this: He will select the shortest of the lines which may be standing in front of the plurality of gates in operation whether they be two or four. At this moment he does not know which of the service personnel at the several check-out stations will serve him since they will serve the customers in the order that they are free and in the order that the customers arrive at the entrance gates to the service area. When the customer arrives at the head of his line in front of the entrance gate he will be standing on the mat switch which provides a means to sense his presence. When the next check-out station is free the control indicator means will be operated by the check-out person there and the customer will be apprised of such action through a buzzing of the unlatch solenoid at his gate. A master "You Are Next" light indicator on the signal director 45 will be lighted as well as an individual numbered light and arrow telling the customer which check-out station to go to for service and which direction he will find it in. He will then push through the gate and proceed to that check-out station. The gate will close behind him and the spring loaded latch will keep it closed until the gate selector 79 has returned to that particular gate and another customer is ready for service.

From the point of view of the service person at the check-out station the operation is this: When he is nearly free he will operate his control-indicator means which will appear in the form described and shown in this specification as a single transparent button with two poles and a single light behind it. If there is a customer standing on the mat switch in front of the entrance gate selected by gate selector 79 he will be apprised of same by a light in the control-indicator means. This light will be extinguished upon the release of the control means even though the director signal lights at the gate selected will remain on to direct the individual or customer to his check-out station. During the period that he is serving this individual there will be no line standing behind providing for a feeling of less pressure on the part of the service person which will provide for more efficient service to the customer.

If the service person operates the control indicator means at his station and receives no light, he will depress it again since when he releases it the next gate in the sequence will be selected at which a customer may be waiting. If it is necessary to press the button several times before finding a gate which is occupied, it may be necessary to cut the operation from four to two gates. When the customer load becomes so small that the system is no longer necessary then the gates may be thrown open and the check-out regulator system according to the present invention turned off until the customer load becomes heavy again.

A means has been disclosed in this specification for regulating check-out procedures at a large commercial or other type of institution wherein many individuals must be provided service by a small group of service personnel and in which those individuals require differing degrees and lengths of service whereby each individual is served with fairness and in exact rotation. Having disclosed the details and function of the check-out regulator system for stores, I claim the following combinations and their equivalence as my invention:

1. A customer check-out regulator system including:
 (a) a closed customer service area having a plurality of normally closed entrance gates and exits,
 (b) a plurality of check-out stations in the service area between the entrance gates and the exits,
 (c) means in front of each entrance gate to sense the presence of each customer desiring entry to the service area,
 (d) means to select each of the plurality of gates for sequential opening according to the time sequence of customer arrival at the plurality of gates as sensed by said means in front of the said gates, (e) means at each check-out station operable by a service person there to operate the gate selecting means, (f) director signal lights at each gate to direct the customer to the check-out station responsive to opening of the selected gate.

2. A customer check-out regulator system including:
(a) an enclosed customer service area,
(b) a plurality of check-out stations each having a control means within the service area,
(c) exits from the service area,
(d) a plurality of normally closed entrance gates into the enclosed area,
(e) means in front of each entrance gate to sense the presence of a customer and means responsive to the sensing of the presence to indicate that presence at the check-out stations,
(f) an electrical current power source connected to the means to sense and connected to the check-out station control means,
(g) a sequential gate selector actuated in response to operation of the check-out station control means and the sensing means so that there will be a single gate selected for opening at any moment according to the time sequence of customer arrival at the plurality of gates,
(h) means to unlatch the selected gate actuated by operation of the check-out station control means,
(i) gate director signal lights at the selected gate actuated by operation of the check-out station control means to direct the customer to the check-out station at which the check-out station control means was operated.

3. A customer check-out regulator system including:
(a) an enclosed customer service area,
(b) a plurality of check-out stations each having a control means within the service area,
(c) exits from the service area,
(d) a plurality of normally closed entrance gates into the enclosed area,
(e) means in front of each entrance gate to sense the presence of a customer and means responsive to the sensing of the presence to indicate that presence at the check-out stations,
(f) an electrical current power source connected to the means to sense and connected to the check-out station control means,
(g) a sequential gate selector actuated in response to operation of the check-out station control means and the sensing means so that there will be a single gate selected for opening at any moment according to the time sequence of customer arrival at the plurality of gates,
(h) means to unlatch the selected gate actuated by operation of the check-out station control means,
(i) gate director signal lights at the selected gate actuated by operation of the check-out station control means to direct the customer to the check-out station at which the check-out station control means was operated,
(j) means responsive to the operation of the check-out station control means to cause the sequential gate selector to select the next gate in sequence.

4. A customer check-out regulator including:
(a) an enclosed customer service area,
(b) a plurality of check-out stations each having a control means within the service area,
(c) exits from the service area,
(d) a plurality of normally closed entrance gates into the enclosed area,
(e) means in front of each entrance gate to sense the presence of a customer and means responsive to the sensing of the presence to indicate that presence at the check-out stations,
(f) an electrical current power source connected to the means to sense and connected to the check-out station control means,
(g) a sequential gate selector actuated in response to operation of the check-out station control means and the sensing means so that there will be a single gate selected for opening at any moment according to the time sequence of customer arrival at the plurality of gates,
(h) means to unlatch the selected gate actuated by operation of the check-out station control means,
(i) gate director signal lights at the selected gate actuated by operation of the check-out station control means to direct the customer to the check-out station at which the check-out station control means was operated,
(j) means responsive to the operation of the check-out station control means to cause the sequential gate selector to select the next gate in sequence,
(k) a gate director signal light hold circuit to maintain the director signal light at the gate energized until the customer has passed through the gate.

5. A customer check-out regulator system including:
(a) an enclosed customer service area,
(b) a plurality of check-out stations each having a control means within the service area,
(c) exits from the service area,
(d) a plurality of normally closed entrance gates into the enclosed area,
(e) means in front of each entrance gate to sense the presence of a customer and means responsive to the sensing of that presence to indicate that presence at the check-out stations,
(f) an electrical current power source connected to the means to sense and connected to the check-out station control means,
(g) a sequential gate selector actuated in response to operation of the check-out station control means and the sensing means so that there will be a single gate selected for opening at any moment according to the time sequence of customer arrival at the plurality of gates,
(h) means to unlatch the selected gate actuated by operation of the check-out station control means,
(i) gate director signal lights at the selected gate actuated by operation of the check-out station control means to direct the customer to the check-out station at which the check-out station control means was operated,
(j) means responsive to the operation of the check-out station control means to cause the sequential gate selector to select the next gate in sequence,
(k) a gate director signal light hold circuit to maintain the director signal light at the gate energized until the customer has passed through the gate,
(l) means to cut some of the plurality of entrance gates out of operation.

6. A customer check-out regulator system including:
(a) an enclosed customer service area,
(b) a plurality of check-out stations within the service area, control means at each check-out station,
(c) exits from the service area,
(d) a plurality of normally closed entrance gates into the service area, means to hinge each gate on a vertical axis to permit passage of a customer waiting to be served, a biased closed latch on each entrance gate to prevent opening of the gate, an unlatch solenoid to open the latch, means to close the gate after the passage of a customer including a pneumatic closer and levers,
(e) means in front of each gate to sense the presence of a customer,
(f) an electric current power source connected to the means to sense and connected to the check-out station control means,
(g) a sequential gate selector actuated in response to operation of the check-out station control means and the sensing means so that there will be a single gate selected for opening at any moment according to the time sequence of customer arrival at the plurality of gates, (h) means to unlatch the selected gate responsive to simultaneous presence of a customer in front of the selected gate and operation of the check-out station control means, (i) director signal lights at each gate, means to operate the director signal lights responsive to operation of the check-out station control means.

7. A customer check-out regulator system including:

(a) an enclosed customer service area, (b) a plurality of check-out stations within the service area, control means at each check-out station, (c) exits from the service area, (d) a plurality of normally closed entrance gates into the service area, means to hinge each gate on a vertical axis to permit passage of a customer waiting to be served, a biased closed latch on each entrance gate to prevent opening of the gate, an unlatch solenoid to open the latch, means to close the gate after the passage of a customer including a pneumatic closer and levers, (e) means in front of each gate to sense the presence of a customer, (f) an electric current power source connected to the means to sense and connected to the check-out station control means, (g) a sequential gate selector actuated in response to operation of the check-out station control means and the sensing means so that there will be a single gate selected for opening at any moment according to the time sequence of customer arrival at the plurality of gates, (h) means to unlatch the selected gate responsive to simultaneous presence of a customer in front of the selected gate and operation of the check-out station control means, (i) director signal lights at each gate, means to operate the director signal lights responsive to operation of the check-out station control means, (j) means responsive to termination of operation of the check-out station control means to cause the gate selector rotary switch to select the next gate in sequence.

8. A customer check-out regulator system including:

(a) an enclosed customer service area, (b) a plurality of check-out stations within the service area, control means at each check-out station, (c) exits from the service area, (d) a plurality of normally closed entrance gates into the service area, means to hinge each gate on a vertical axis to permit passage of a customer waiting to be served, a biased closed latch on each entrance gate to prevent opening of the gate, an unlatch solenoid to open the latch, means to close the gate after the passage of a customer including a pneumatic closer and lever, (e) means in front of each gate to sense the presence of a customer, (f) an electric current power source connected to the means to sense and connected to the check-out station control means, (g) a sequential gate selector actuated in response to operation of the check-out station control means and the sensing means so that there will be a single gate selected for opening at any moment according to the time sequence of customer arrival at the plurality of gates, (h) means to unlatch the selected gate responsive to simultaneous presence of a customer in front of the selected gate and operation of the check-out station control means, (i) director signal lights at each gate, means to operate the director signal lights responsive to operation of the check-out station control means, (j) means responsive to termination of operation of the check-out station control means to cause the gate selector rotary switch to select the next gate in sequence, (k) a gate director signal light hold circuit responsive to simultaneous energization of the means to sense the presence of a customer in front of the selected gate and operation of the check-out station control means to keep the director signal lights energized until the customer has passed through the gate.

9. A customer check-out regulator system including:

(a) an enclosed customer service area, (b) a plurality of check-out stations within the service area, control means at each check-out station, (c) exits from the service area, (d) a plurality of normally closed entrance gates into the service area, means to hinge each gate on a vertical axis to permit passage of a customer waiting to be served, a biased closed latch on each entrance gate to prevent opening of the gate, an unlatch solenoid to open the latch, means to close the gate after the passage of a customer including a pneumatic closer and levers, (e) means in front of each gate to sense the presence of a customer, (f) an electric current power source connected to the means to sense and connected to the check-out station control means, (g) a sequential gate selector actuated in response to operation of the check-out station control means and the sensing means so that there will be a single gate selected for opening at any moment according to the time sequence of customer arrival at the plurality of gates, (h) means to unlatch the selected gate responsive to simultaneous presence of a customer in front of the selected gate and operation of the check-out station control means, (i) director signal lights at each gate, means to operate the director signal lights responsive to operation of the check-out station control means, (j) means responsive to termination of operation of the check-out station control means to cause the gate selector rotary switch to select the next gate in sequence, (k) a gate director signal light hold circuit responsive to simultaneous energization of the means to sense the presence of a customer in front of the selected gate and operation of the check-out station control means to keep the director signal lights energized until the customer has passed through the gate, (l) and switch means to cut a part of the plurality of entrance gates out of operation leaving the remainder of the gates to continue operation.

References Cited by the Examiner
UNITED STATES PATENTS 1,345,481  7/20  Davis.
1,544,949  7/25  Smiley.
1,788,759  1/31  Anderson _____ 186—1

ROBERT B. REEVES, *Acting Primary Examiner.*

KARL J. ALBRIGHT, ANDRES H. NIELSEN, SAMUEL F. COLEMAN, *Examiners.*